(No Model.)
A. J. LECHLER.
MACHINE FOR ROLLING PLASTIC MATERIAL.
No. 343,523. Patented June 8, 1886.
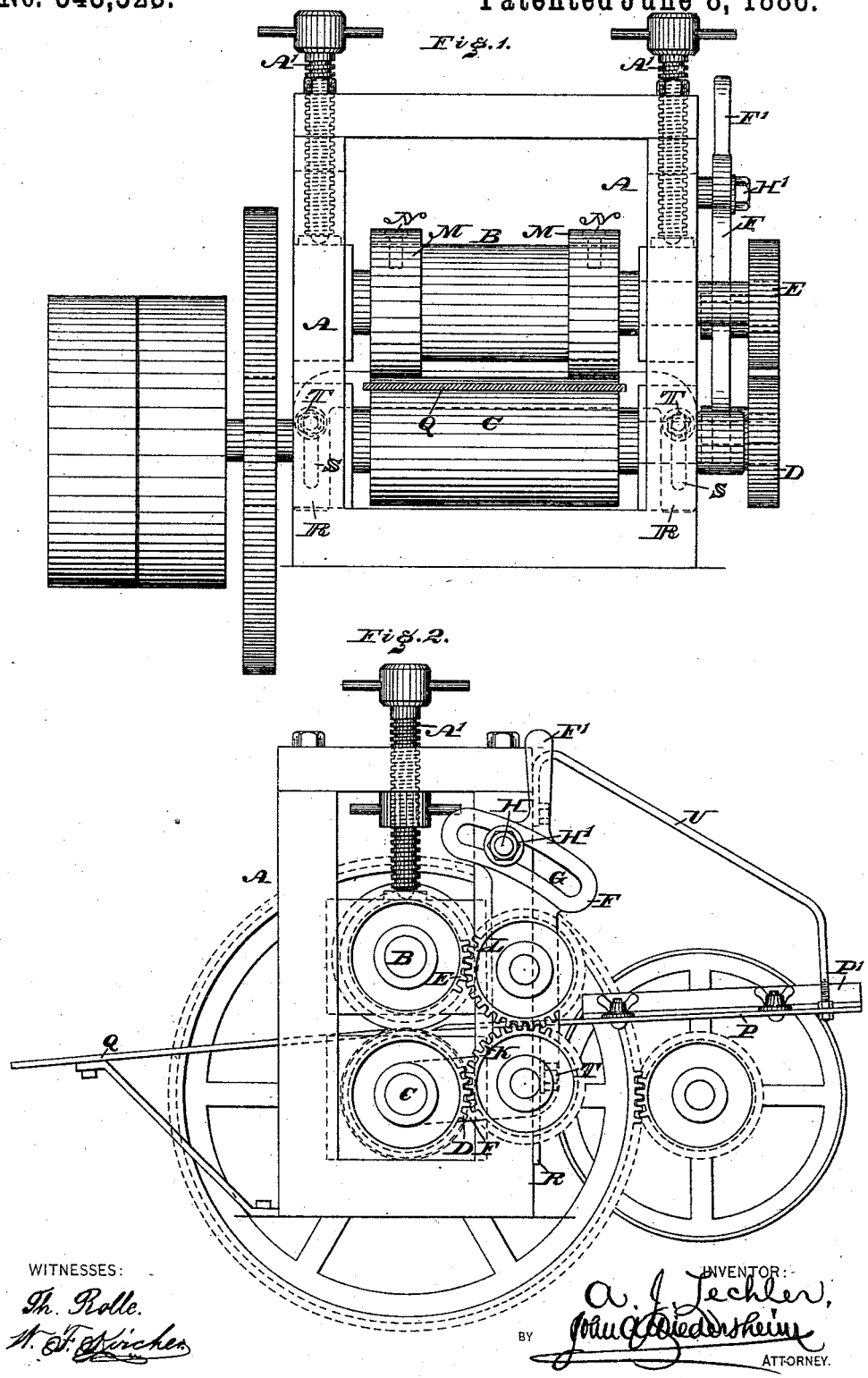
WITNESSES:
Th. Rolle.
N. F. Kircher
INVENTOR:
A. J. Lechler
BY John A. Wiedersheim
ATTORNEY.

UNITED STATES PATENT OFFICE.

ANTHONY J. LECHLER, OF PHILADELPHIA, PENNSYLVANIA, ASSIGNOR TO JOHN F. HOPE, OF SAME PLACE.

MACHINE FOR ROLLING PLASTIC MATERIAL.

SPECIFICATION forming part of Letters Patent No. 343,523, dated June 8, 1886.

Application filed October 17, 1885. Serial No. 180,128. (No model.)

*To all whom it may concern:*

Be it known that I, ANTHONY J. LECHLER, a citizen of the United States, residing in the city and county of Philadelphia, State of Pennsylvania, have invented a new and useful Improvement in Machines for Rolling Plastic Material or Composition for Picture-Frames, which improvement is fully set forth in the following specification and accompanying drawings, in which—

Figure 1 represents a front elevation of a machine for rolling composition for picture-frames embodying my invention. Fig. 2 represents a side elevation thereof.

Similar letters of reference indicate corresponding parts in the two figures.

My invention consists of a machine for producing plastic material, used for decorating picture-frames, in a sheet of even thickness before submitting it to the action of the embossing-rollers.

It also consists of novel means for adjusting the width of the sheet.

Referring to the drawings, A represents the housing or frame of the machine, and B C represent rollers which are mounted thereon. The shafts of said rollers are extended and carry on their ends pinions or spur-wheels D E, respectively, and either shaft receives power in a suitable manner. To the frame A are fitted screws A' A', which bear upon the boxes of the shaft of the upper roller, B, for preventing upward separation of the latter from the roller C, and admitting of vertical adjustment of said roller B. Between the side of the frame and the wheels D E is a bent arm, F, mounted on the shaft of the roller C, and free to move thereon. The upper end of the arm F has a segmental slot, G, which receives a bolt, H, the latter being connected with the frame A and provided with a nut, H', for tightening purposes.

The arm F has a handle, F', and carries two pinions, K L, meshing with each other, the pinion K also meshing with the wheel D of the roller B, and the pinion L meshing with the wheel E of the roller C, it being noticed that the spur-wheels D E do not mesh, but are geared by means of the pinions K L, and thus rotated in the proper direction.

The roller B has screwed to its periphery two collars, M, which are retained in position by set-screws N, and adapted to be adjusted laterally relatively to the width of the sheet of plastic material, it being noticed that the collars M rest on the roller C, and leave between the rollers B C a space equal to the thickness of the sheet of plastic material to be formed.

P represents a feed-apron, and Q a discharge-apron, for the machine, the feed-apron having an adjustable guide, P', for more truly directing the material to be rolled between the rollers B C and collars M.

It will be seen that the material or composition is fed to the rollers B C, is passed through the same, and formed into a continuous sheet of uniform thickness and width.

Should it be desired to change the width of the sheet, the collars M are adjusted on the roller B, or moved toward or from each other the required extent; and in order to change the thickness of the sheet the collars M are removed from the roller B, and collars of required diameter substituted therefor. This necessitates the vertical adjustment of the roller B, and as the spur-wheel E rises and falls with the shaft of said roller the pinion L may be adjusted in relation to the position of said wheel E by moving the arm F so that the pinion properly meshes with said spur-wheel.

When it is desired to stop the feeding operation of the rollers, the arm F is moved in the direction from the roller B, whereby the pinion L is withdrawn from the spur-wheel E, and rotation of the roller B then ceases. By moving the arm toward the roller, the pinion and spur-wheel again engage, and the roller is thereby operated. The feed-apron may be vertically adjusted in relation to the rollers B C, for which purpose it has connected with it an arm, R, the same having vertically-extending slots S, through which pass bolts T, the latter being secured to the frame A, and tightly holding the arm in position.

In order to assist in sustaining the feed-apron, I employ a brace, U, which is connected with said apron and the frame A, and permits the vertical adjustment of the apron.

Having thus described my invention, what I claim as new, and desire to secure by Letters Patent, is—

1. In a machine for rolling plastic material, a roller having removable collars with fastening devices, substantially as and for the purpose set forth.

2. In a machine for rolling plastic material, a roller having a vertical adjustment and provided with collars having screws, substantially as and for the purpose set forth.

3. In a machine for rolling plastic material, the roller B, having its journal-bearings in boxes in the frames A, and provided with movable collars M, having screws N, substantially as and for the purpose set forth.

4. In a machine for rolling plastic material, a lower roller of uniform thickness, in combination with an upper roller having movable collars with screw-fastenings, and an adjustable gearing connecting pinions attached to said lower and upper rollers, substantially as and for the purpose set forth.

5. In a machine for rolling plastic material, a pair of rollers, one of which has movable collars admitting of lateral adjustment, and a clamping device, in combination with adjustable gearing for operating said rollers and an adjustable feed-apron, all arranged and operated substantially as and for the purpose set forth.

A. J. LECHLER.

Witnesses:
   JOHN A. WIEDERSHEIM,
   W. F. KIRCHER.